United States Patent
Chu et al.

(10) Patent No.: US 10,199,811 B2
(45) Date of Patent: Feb. 5, 2019

(54) PLASTIC CORRUGATED TUBE FOR SURROUNDING PIPES AND METHOD FOR PRODUCING SUCH A CORRUGATED TUBE

(71) Applicant: Schlemmer GmbH, Poing (DE)

(72) Inventors: Van Ngoc Chu, Poing (DE); Matthias Buettner, Koenigsberg (DE)

(*) Notice: Subject to any disclaimer, the term of this patent is extended or adjusted under 35 U.S.C. 154(b) by 0 days.

(21) Appl. No.: 15/321,720

(22) PCT Filed: May 19, 2015

(86) PCT No.: PCT/EP2015/061018
§ 371 (c)(1),
(2) Date: Dec. 22, 2016

(87) PCT Pub. No.: WO2015/197266
PCT Pub. Date: Dec. 30, 2015

(65) Prior Publication Data
US 2017/0141553 A1 May 18, 2017

(30) Foreign Application Priority Data
Jun. 23, 2014 (DE) .......................... 10 2014 108 757

(51) Int. Cl.
*F16L 11/00* (2006.01)
*H02G 3/04* (2006.01)
(Continued)

(52) U.S. Cl.
CPC ....... *H02G 3/0468* (2013.01); *B29C 47/0023* (2013.01); *B29C 47/0033* (2013.01);
(Continued)

(58) Field of Classification Search
CPC .............. H02G 3/0468; B29C 47/0033; B29C 66/1122; F16L 11/118
(Continued)

(56) References Cited

U.S. PATENT DOCUMENTS

| 3,336,950 A | * | 8/1967 | Fochler | .................. | F16L 9/127 |
| | | | | | 138/121 |
| 4,513,787 A | | 4/1985 | Hegler et al. | | |

(Continued)

FOREIGN PATENT DOCUMENTS

| DE | 3246594 A1 | 6/1984 |
| DE | 3405552 A1 | 8/1985 |

(Continued)

OTHER PUBLICATIONS

ISA European Patent Office, International Search Report and Written Opinion Issued in Application No. PCT/EP2015/061018, dated Aug. 11, 2015, WIPO, 11 pages.

(Continued)

*Primary Examiner* — James Hook
(74) *Attorney, Agent, or Firm* — Alleman Hall Creasman & Tuttle LLP (57) ABSTRACT

A plastic corrugated tube having corrugations distributed over its length and a longitudinal slit running along a lateral longitudinal line is provided. The corrugated tube can be converted into an open position by opening the longitudinal slit and into a closed position in which edge regions of the corrugated tube overlap, wherein the corrugated tube is elastically prestressed toward its closed position. The corrugations on the edge region of the corrugated tube, which in the closed position lies radially below the other edge region of the corrugated tube, are offset radially inwards within a predefined circumferential region with respect to the corrugations outside this circumferential region and are designed such that, in the closed position, they are in engagement with the radial underside of the corrugations of the other edge region, which corrugations engage over them such that they are mutually displaceable in the circumferential direction.

13 Claims, 4 Drawing Sheets

(51) Int. Cl.
  B29C 47/00 (2006.01)
  B29C 47/06 (2006.01)
  B29C 47/12 (2006.01)
  B29C 53/30 (2006.01)
  B29C 65/14 (2006.01)
  B29C 65/00 (2006.01)
  F16L 11/118 (2006.01)
  H01B 3/44 (2006.01)
  B29K 21/00 (2006.01)
  B29K 23/00 (2006.01)

(52) U.S. Cl.
  CPC ...... *B29C 47/0059* (2013.01); *B29C 47/0066* (2013.01); *B29C 47/065* (2013.01); *B29C 47/126* (2013.01); *B29C 53/30* (2013.01); *B29C 65/1412* (2013.01); *B29C 66/1122* (2013.01); *B29C 66/522* (2013.01); *F16L 11/118* (2013.01); *H01B 3/441* (2013.01); *B29C 66/712* (2013.01); *B29C 2793/009* (2013.01); *B29C 2793/0036* (2013.01); *B29K 2021/003* (2013.01); *B29K 2023/12* (2013.01); *B29K 2995/007* (2013.01)

(58) Field of Classification Search
  USPC .................................................. 138/121, 122
  See application file for complete search history.

(56) References Cited

U.S. PATENT DOCUMENTS

| | | | | |
|---|---|---|---|---|
| 4,766,662 A * | 8/1988 | Bradshaw | ................ | F01P 11/04 138/151 |
| 4,986,575 A | 1/1991 | Braun | | |
| 5,566,722 A * | 10/1996 | Bartholomew | ......... | B29C 49/00 138/121 |
| 6,034,329 A | 3/2000 | Kawamura | | |
| 6,078,009 A | 6/2000 | Kawamura | | |
| 6,079,451 A | 6/2000 | Hegler | | |
| 6,096,975 A * | 8/2000 | Streit | .................... | B29C 47/126 138/128 |
| 6,323,425 B1 * | 11/2001 | Hegler | ................ | B29C 49/0021 174/102 D |
| 6,341,626 B1 * | 1/2002 | Davenport | ................ | F16L 3/26 138/110 |
| 6,488,053 B1 * | 12/2002 | Tadokoro | ................ | F16L 11/15 138/110 |
| 6,843,276 B2 | 1/2005 | Tadokoro | | |
| 7,891,383 B2 * | 2/2011 | Baverel | .................. | B26D 3/001 138/115 |
| 2005/0011569 A1 * | 1/2005 | Della Putta | ............. | F01N 13/14 138/110 |
| 2005/0274535 A1 * | 12/2005 | Koike | .................. | H02G 3/0468 174/481 |
| 2014/0027002 A1 * | 1/2014 | Sugiyama | ............ | H02G 3/0468 138/121 |
| 2014/0255627 A1 * | 9/2014 | Yamaguchi | ............. | F16L 57/06 428/34.1 |
| 2017/0030498 A1 * | 2/2017 | Chu | ....................... | B21C 37/121 |

FOREIGN PATENT DOCUMENTS

| | | |
|---|---|---|
| DE | 19641421 A1 | 4/1998 |
| DE | 19700916 A1 | 7/1998 |
| DE | 19705761 A1 | 8/1998 |
| DE | 69711787 T2 | 11/2002 |
| EP | 0291418 A1 | 11/1988 |
| EP | 0860921 A1 | 8/1998 |
| EP | 2182599 A1 | 5/2010 |
| WO | 9411663 A1 | 5/1994 |

OTHER PUBLICATIONS

The State Intellectual Property Office of the People's Republic of China, First Office Action Issued in Chinese Application No. 201580034396.4, dated Oct. 23, 2017, 15 pages. (Submitted with English Translation of First Office Action).

State Intellectual Property Office of the People's Republic of China, Office Action and Search Report Issued in Application No. 201580034396.4, dated Aug. 3, 2018, 16 pages.

* cited by examiner

PLASTIC CORRUGATED TUBE FOR SURROUNDING PIPES AND METHOD FOR PRODUCING SUCH A CORRUGATED TUBE

The invention pertains to a plastic corrugated tube for the encasing of conductors, with encircling corrugations alternating in succession and distributed along its length, and having a longitudinal slit extending along a lateral longitudinal line, as well as a method for making such a corrugated tube.

Lengthwise-slit plastic corrugated tubes are generally known and are used in particular for encasing electrical conductors which are laid in motor vehicles. The longitudinal slit serves for an easier placement of the cables inside the corrugated tubes, for which purpose the particular corrugated tube is spread apart, either using a special tool or also by hand, to expose the slit, which can be opened wide enough so that the prepared cables or cable harnesses can be inserted there through the slit.

In the condition as introduced in the vehicle, however, the corrugated tubes with the enclosed electrical conductors are closed so that they also afford a protection against penetration of unwanted influences (such as dirt, chemical or corrosive elements, etc.).

In order to achieve a good closure of the edge regions of the corrugated tube lying against each other on either side of the longitudinal slit after inserting the electrical conductors in such plastic corrugated tubes, a variety of different configurations are known, allowing a mutual locking of these edge regions in the circumferential direction against each other, whether by form fitting or by the use of applied locking elements, for a good and effective closure of the corrugated tube (e.g., DE 32 46 594 A1, DE 34 05 552 A1, DE 196 41 421 A1, DE 197 00 916 A1, DE 197 05 761 A1, EP 0 291 418 A1, EP 0 860 921 A1, EP 2 182599 A1, WO 94/11663 A1), However, what is common to all these solutions is that a corrugated hose so outfitted must always be assigned a particular nominal width, so that if, for example, a somewhat larger nominal width should be required for an individual instance, it would also be necessary to employ a corrugated hose designed especially for this nominal width.

Starting from this, the problem which the invention proposes to solve is to propose a corrugated hose of the kind mentioned above which can be used for a certain range of nominal widths, without needing to be modified for this, resulting in a distinctly broader area of application and a more favorable inventory situation, and also consequentially a greater economy of use.

Furthermore, a manufacturing process for the production of such a corrugated tube is to be proposed.

According to the invention, the first-mentioned problem is solved by a plastic corrugated tube for the encasing of conductors, with corrugations alternating in succession and distributed along its length, i.e., corrugation peaks and corrugation valleys, and having a longitudinal slit extending along a lateral longitudinal line, wherein the corrugated tube for the inserting of the conductors can be converted into an opened position, exposing the longitudinal slit, and also into a closed position, in which the edge regions of the corrugated tube lying on either side of the longitudinal slit overlap, wherein the corrugated tube is elastically prestressed in the direction of assuming its closed position, and the edge region of the corrugated tube lying radially underneath the other edge region of this corrugated tube in the closed position is likewise provided with corrugations on its circumference over a predetermined circumferential region, which corresponds to a maximum overlap region of the two edge regions in the closed position, which corrugations are however offset radially inwards as compared to the corrugations outside of the predetermined circumferential region and are configured such that in the closed position they engage with the radial underside of the corrugations on the other edge region, which corrugations engage so as to be displaceable relative to each other in the circumferential direction.

In the case of the corrugated tube according to the invention, after inserting the electrical conductors into the corrugated tube the edge regions of the corrugated tube shell lying on either side of the longitudinal slit are brought into an overlapping closed position in which the longitudinal slit is closed by this overlapping of the edge regions. However, no closure elements are arranged at these overlapping edge regions, which enter into a locking engagement with each other in the closed position and thus secure the two edge regions to each other. Instead, in the corrugated tube according to the invention, the design principle is adopted that in its closed position the overlapping edge regions are only elastically prestressed into their closed position and thus in the direction of a mutual overlapping. Thus, when the longitudinal slit is removed, the two edge regions are converted into a mutual overlapping arrangement to assume a closed position under the action of this elastic prestressing and are held in this position automatically by the prestressing, without requiring the use of interlocking closure elements for this.

In the closed position the one of the two edge regions of the corrugated tube lies radially underneath the other edge region, the edge region lying radially underneath being termed hereafter the "bottom" edge region and the edge region lying radially on top of it the "top" edge region. On the bottom edge region there are arranged corrugations (in the form of corrugation peaks and corrugation valleys on its circumference over a predetermined circumferential region thereof, yet these are offset radially inwards relative to the corrugations outside this predetermined circumferential region (which also correspond to those at the other edge region). In the closed position, the corrugations of the bottom edge region lie against the radial underside of the corrugations on the other, top edge region and engage with them, being overlapped h the latter in the circumferential direction and the corrugations of the two edge regions being displaceable relative to each other in the circumferential direction of the corrugated tube.

Because the corrugations of the bottom and top edge region engage with each other, and are able to be displaced relative to each other, when the latter overlaps the firmer in the circumferential direction of the plastic tube, after the electrical conductors are inserted through the longitudinal slit inside the corrugated tube according to the invention and thanks to the releasing of the edge regions on account of the elastic prestressing acting on the latter in the direction of a closed position there occurs an automatic pushing of the top edge region against the bottom edge region in the circumferential direction of the corrugated tube until such time as the closed position is finally achieved. This closed position is dictated by the quantity of electrical conductors placed inside the corrugated tube through the longitudinal slit. If only comparatively few conductors are laid in the tube, the closed position will be achieved in that the top edge region overlaps the radially downwardly offset corrugations on the bottom edge region over the entire predetermined circumferential region, which corrugations are present only in this circumferential region and which are then adjoined in the further circumference of the corrugated tube by the corrugations which lie further radially outward and which extend continuously as far as the end of the other edge region. At the end of the predetermined circumferential region with its radially lower lying corrugations, however, the top edge region, automatically continuing the mutual overlapping under the action of the elastic prestressing, is prevented from further displacement on the bottom edge region in the circumferential direction, because the adjoining corrugations there at the bottom edge region are again radially offset outwards, so that a mechanical stop to prevent further relative displacement in the circumferential direction is thus produced at this transition site for the top edge region.

However, if a larger quantity of electrical conductors is placed inside the corrugated tube, which therefore also require more space inside the corrugated tube, corresponding to a larger nominal width of the tube, the top edge region upon releasing of the two edge regions no longer runs so far in the circumferential direction under the elastic prestressing in the direction of a closed position that an overlapping of the two edge regions exists over the entire predetermined circumferential region. Instead, the closed position here is reached already upon reaching a smaller overlap distance of the two edge regions, such as is only just possible upon closing the corrugated tube due to the greater filling of the internal space of the corrugated tube with electrical conductors.

In this way, the corrugated tube according to the invention affords the possibility of being used over a certain range of different nominal widths, without requiring a modification of the corrugated tube according to the invention. The range of variation of its application depends substantially on the size of the predetermined circumferential region with its radially inwardly offset corrugations, so that for conventional corrugated tube sizes a range of two or three nominal widths is easy to achieve, such as 17 and 18 or 17 to 19.

The predetermined circumferential region therefore corresponds to the maximum possible overlap of the two edge regions of the corrugated tube, i.e., the smallest nominal width which can be used for the filling.

At the same time, however, the corrugated tube according to the invention has no need for the facing edge regions on either side of the longitudinal slit to be interlocked with each other in the closed position, which avoids a more costly manufacturing and a more complicated design of the closure. Instead, the invention realizes a self-closing corrugated hose of very diversified use, which affords significant advantages both in manufacturing technology and the installation process over corrugated hoses requiring closure elements able to interlock with each other in the circumferential direction in their closed position.

In an especially preferred embodiment of the invention, the mutually engaging corrugations of the two edge regions of the corrugated tube along the longitudinal slit are brought together by a displacement movement relative to each other with a form fitting in the displacement direction, which reliably prevents the edge regions bordering; the longitudinal slit from being able to be displaced relative to each other in the axial direction of the corrugated tube, thus preventing the occurrence of sharp-edged pieces at the sliced end of the tube, which might stick out and damage the conductors situated on the inside.

Likewise, it is advantageous for the corrugated tube according to the invention that its inner surface is provided with a layer of a material which is softer than the rest of the material of the corrugated tube.

Another advantageous embodiment of the invention also consists in that in the corrugated tube according to the invention the radially bottom of the two edge regions in the closed position at its end segment directly next to the longitudinal slit consists of a material which is softer than the rest of the material of the corrugated tube.

In the above mentioned cases in which a softer material is used on the corrugated tube besides the material of the corrugated tube, the softer material used is preferably a thermoplastic elastomer (TPE) with a Shore A hardness of less than 80 and for the rest of the material of the corrugated tube a polypropylene is used with a Shore D hardness of more than 60.

The configuration of the radially lower of the two edge regions in the closed position at its end segment directly next to the longitudinal slit being made of a softer material than the rest of the material of the corrugated tube means that its freely projecting end forms a side of the longitudinal slit projecting somewhat radially into the inside of the corrugated tube in the closed. position and thanks to its configuration there made of a softer material it also forms a soft slit edge, which reliably prevents a damaging of the electrical conductors contained therein.

The invention furthermore concerns a method for manufacturing corrugated tubes according to the invention, as are described above, involving the following steps:

a tube of a suitable thermoplastic material (such as PP) is extruded continuously from an extruder;

the extruded tube is deformed in a following corrugator into a corrugated tube with corrugations on the circumference, having on one side of a lateral longitudinal line corrugations along a predetermined circumferential region which are offset radially inwards with respect to the corrugations outside this predetermined circumferential region;

the corrugated tube is provided with a longitudinal slit running along the lateral longitudinal line in a slitting device connected after the corrugator after this, the lengthwise-slit corrugated tube is taken through an IR deformation layout in which it is moved in stepwise fashion into a predetermined closed position under heating to a temperature lying below the melting temperature of the thermoplastic material with overlapping of the edge regions of the corrugated tube lying on either side of the longitudinal slit;

directly after converting the corrugated tube to the predetermined closed position in the IR deformation layout, the corrugated tube is taken to a following cooling system and cooled down there;

after this, the corrugated tube is wound up as meterware or sliced into predetermined pieces.

In the method according to the invention, after the extrusion and the shaping in the corrugator the longitudinal slit is made along the lateral longitudinal line, on one side of which corrugations are applied on the outer circumference of the corrugated tube along a predetermined circumferential region which corrugations are offset radially inwards with respect to the other corrugations. The longitudinal slit is thus formed in the slitting device at the location of the transition between the corrugations which are placed further outside radially and those which are formed offset radially inwards.

In the IR deformation layout, a thermal deformation of the lengthwise-slit corrugated tube is performed, which is heated to a temperature lying below the melting temperature of its thermoplastic material, and its edge regions upon moving through shaping rollers are shoved stepwise one across the other and brought into an increasing overlap relative to each other, until a predetermined closed position (maximum overlap of both edge regions) is achieved.

The directly following cooldown of the corrugated tube in a cooling system then results in a corrugated tube in a dosed position with maximum overlap of the edge regions, which is wound up in a Mowing step as meterware or sliced into predetermined pieces.

For use, the corrugated tube is spread out into an open position with a suitable device, in which the longitudinal slit is released and opened far enough so that the conductors to be inserted can be placed inside. After this, a spontaneous closing of the corrugated tube occurs as a result of the elastic prestressing, which presses it in the direction of its closed position, corresponding at most to the overlap of the two edge regions that was imprinted on the corrugated tube in the IR deformation layout during the manufacturing of the corrugated tube. However, now, if a larger quantity of conductors is placed inside the opened corrugated tube that requires a space that would correspond to a. larger nominal width of the corrugated tube, when the two edge regions spring back into their mutually overlapping closed position there will be less overlap than in the aforementioned case, which is still possible on account of the now larger filling of the corrugated tube with conductors due to the larger space required on the inside of the corrugated tube.

The closed position achieved by the thermal deformation of the corrugated tube during its manufacturing results in a strove elastic prestressing in the direction of the closed position when the corrugated tube is spread open for the inserting of conductors, which produces a secure and effective closure of the corrugated tube in the closed position when it is filled with conductors, so that even after its installation there is achieved a long-lasting fixation and a good protection against unwanted penetration of din particles and the like.

A most especially favorable embodiment of the method according to the invention results when the injection head is further fed with a second thermoplastic material from a second extruder, which is softer than the plastic fed from the other extruder, wherein the plastic tube extruded from the injection head consists of a lengthwise strip of the softer thermoplastic material extending over a predetermined circumferential width along the lateral longitudinal line where the longitudinal slit will be made afterwards, while the rest of the shell of the plastic tube is formed from the other, harder thermoplastic material. The making of the longitudinal slit in the slitting device is done in such a way that its lengthwise side facing the corrugations of the radially outward edge region of the corrugated tube in the closed position coincides with the end surface of the softer lengthwise strip of the plastic tube there, and the longitudinal slit is sliced, looking in the circumferential direction of the plastic tube, with a width which is less than the predetermined circumferential width of the softer lengthwise strip in the plastic tube. It has been found to be advantageous in many instances for the longitudinal slit formed on the corrugated tube in the slitting device to be cut out in a width of 3 mm to 5 mm in the opened position of the corrugated tube. Thanks to the two-component extrusion employed in this embodiment of the production method according to the invention and the making of the longitudinal slit in the softer region of the tube, so that when cutting the longitudinal slit it is not the entire softer region which is cut open, but only a segment which is smaller in the circumferential direction than the soft lengthwise strip which is formed on the plastic tube after the extrusion, it is possible to produce a corrugated tube according to the invention with no great additional expense, in which the radially bottom of the two edge regions in the closed position still consists of the softer material on its end segment lying directly next to the longitudinal slit and thus during the use of such a corrugated tube there exists a soft thrust edge inside it, almost totally preventing any damaging of the conductors placed inside.

In totally analogous manner, it is also possible to make a corrugated tube according to the invention whose entire inner surface is provided with a layer of a softer material than the rest of the material of the corrugated tube by performing the two-component extrusion for this in a way so that a plastic tube is extruded from the extruder consisting in the radial direction of a softer internal layer and a radially adjoining outer, harder layer, which is provided with the desired corrugations on its circumference in the following corrugator and then the longitudinal slit is made in the slitting device M the same position as is used during a one-component extrusion.

The invention will be explained more closely hereafter for sake of an example in principle with the aid of the enclosed drawings. There are shown.

Each time parts of identical function are provided with identical reference numbers in the figures, even in different embodiments.

FIGS. 1 to 6, 7 to 9 and FIGS. 12 and 13 each pertain to alternative embodiments of a corrugated tube according to the invention.

Figure 1:
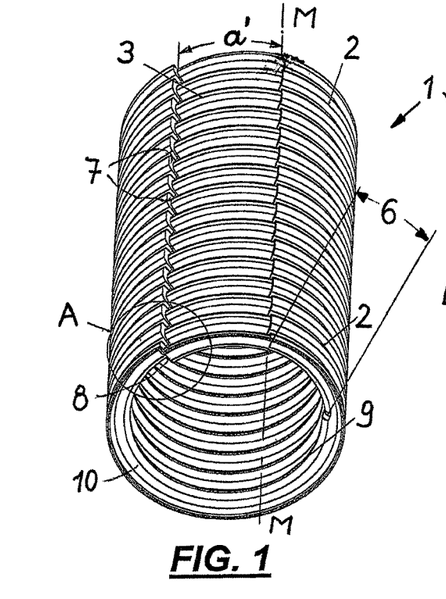
FIG. 1 a perspective view of a corrugated tube according to the invention in the condition directly before making the longitudinal slit.
Figure 2:
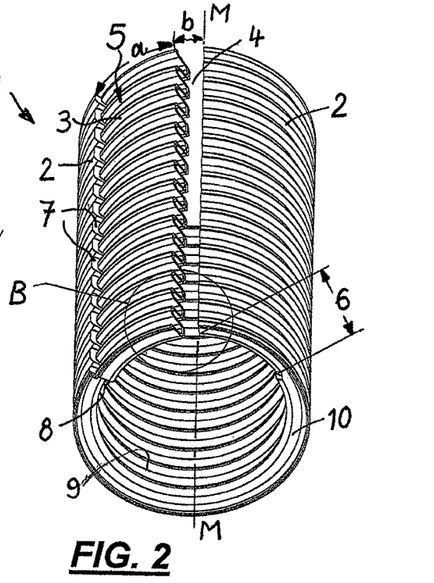
FIG. 2 a perspective representation of the tube of FIG. 1 directly after making the longitudinal slit.
Figure 3:
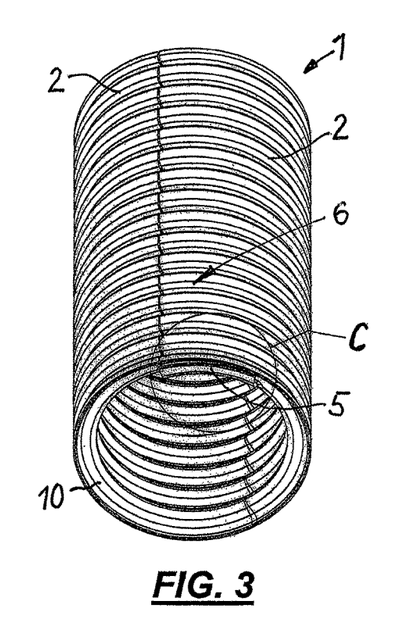
FIG. 3 a perspective representation of the tube of FIGS. 1 and 2 in its closed position with maximum overlap of the edge regions lying on either side of the longitudinal slit, after performing the thermal deformation.

At first referring to the embodiment of a corrugated tube 1 shown in FIGS. 1 to 6, where FIG. 1 shows a perspective view of such a corrugated tube immediately before making a longitudinal slit, FIG. 2 shows a perspective view of the same corrugated tube after making the longitudinal slit 4 and FIG. 3 shows a perspective view of the same corrugated tube 1 in the closed position, while in the dosed position per FIG. 3 the edge regions 5 and 6 of the corrugated tube 1 lying on either side of the longitudinal slit 4 (see FIG. 2) span across a maximum overlap region a (in the circumferential direction).

FIG. 1 shows the corrugated tube 1 in the form which it has during its manufacture after leaving the corrugator and immediately before entering a slicing device.

The corrugated tube 1 is provided here with encircling corrugations 2 on its outer side, consisting of an alternating succession of corrugation peaks and corrugation valleys in the circumferential direction, yet these corrugations 2 do not extend across the entire circumference, as is shown by FIGS. 1 and 2, to which reference is made. Within a particular circumferential region a', moreover, corrugations 3 are likewise provided in the circumferential direction (with corrugation peaks and corrugation valleys), being made between the ends of the corrugations 2 lying opposite each other in the circumferential direction and in positions corresponding to their position. The corrugations 3 within this definite circumferential region a' are however offset relative to the corrugations 2 covering the entire remaining circumference of the corrugated tube 1 by a distance 8 radially toward the inside of the corrugated tube 1, so that here, as shown by the representations of FIGS. 1 and 2 and especially the magnified representation of feature A of FIG. 1 in FIG. 4, the radial underside of the corrugation valleys within this defined circumferential region a' projects somewhat into the inside of the corrugated tube 1.

Figure 4:
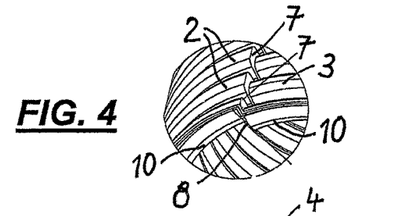
FIG. 4 detail A of FIG. 1, magnified.
Figure 5:
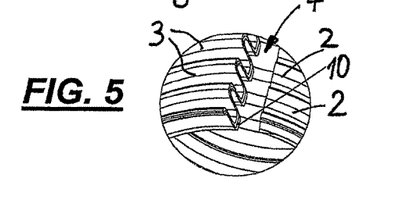
FIG. 5 detail B of FIG. 2, magnified.
Figure 6:
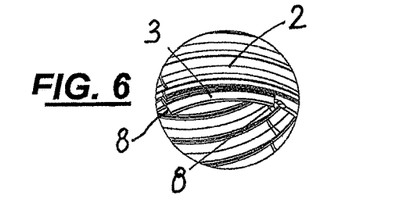
FIG. 6 detail C of FIG. 3, magnified.

Accordingly, as is especially evident from FIG. 4, at the radial outer side of the corrugated tube 1 at the end of each corrugation 2 there is a radially inwardly directed shoulder 7, by which the top side of the corrugation peaks of the corrugations 3, likewise offset radially inwards, runs against or opens into that of the corrugations The longitudinal slit 4 is cut out along a width b in the circumferential direction from the corrugated tube 1, as is shown in FIG. 2, to which reference is made: the longitudinal slit 4 is cut out in such a way that it lies with its one lengthwise side precisely in the transition area where the corrugations 2 pass into each other at one of the two ends of the circumferential region a' via the distance 8 and the shoulder 7, the other lengthwise side of the longitudinal slit 4 being offset by the width b in the direction of the other end of the circumferential region a', so that after making the longitudinal slit 4 there still remains a predetermined circumferential region a with corrugations 2 (with a=a'–b).

The radial distance 8 and the radial shoulder 7, both of the same size, are chosen such that, after making the longitudinal slit 4 along a longitudinal lateral line M-M (see FIGS. 1 and 2) and during a subsequent pressing together of the edge regions 5 and 6 of the corrugated tube 1 present on either side of the longitudinal slit 4 the radial underside 9 of the corrugations 2 of the edge region 6 can be shoved across the radial top side of the corrugations 3 of the other edge region 5, so that the longitudinal slit 4 disappears and an overlap of the edge regions 5 and 6 occurs.

This shoving together of the edge regions 5 and 6 with simultaneous radial overlapping of same can occur to the extent represented in FIG. 3: here, the cut edge facing the longitudinal slit 4 is shoved by the corrugations 2 of the edge region 6 under simultaneous overlapping of the other edge region 5 so far in the circumferential direction onto the latter that it comes to bear against the radial shoulder 7 at the end of the corrugations 2 there.

This maximum overlap of the edge regions 5 and 6, which extends here across the entire remaining circumferential region a, results in a closed position of the corrugated tube 1, as shown in FIG. 3.

It goes without saying that the transition between the corrugations 2 and 3 at the end of the circumferential region a facing the edge region 6 is totally geometrically identical in configuration to the opposite end of the circumferential region a, as shown in FIG. 1 to 3, on the left:

Also at the transition between the corrugations 2 and 3 on the side of the predetermined circumferential region a of the corrugated tube 1 facing the edge region 6 the corrugations 3 of the edge region 5 are situated radially deeper by the radial shoulder 7 than the corrugations 2 at the edge region 6, so that after making the longitudinal slit 4 and with a total overlap of the two edge regions 5, 6 to achieve a closed position, as shown in FIG. 3, an external form for the corrugated tube 1 is obtained showing no radial step in the circumferential direction.

The closed position of the corrugated tube 1 represented in FIG. 3 with maximum overlap of the edge regions 5 and 6 is created during its manufacture by means of thermal deformation in an IR deformation layout (or another deformation layout equally suitable for a thermal deformation treatment), wherein after the cooldown which then occurs the corrugated tube 1 created in this arrangement, as shown by FIG. 3, has its initial form for a subsequent use, which will be discussed separately below.

The magnified representation of feature C from FIG. 3, as shown in FIG. 6, yet again shows in detail the local condition which occurs in this magnified region in the closed position of the corrugated tube represented in FIG. 3.

In the case of the corrugated tube 1 per FIGS. 1 to 6, this is provided on its entire inner side with a soft layer 10 (also see FIG. 5 as a magnified representation of feature B in FIG. 2), so that after making the longitudinal slit 4 the entire radial interior slit edge of the cut surfaces on either side of the longitudinal slit 4 is formed by a soft material, and thus the radial inner edges at the projections 8 also consist of a soft material.

The embodiment of the corrugated tube 1 as is shown in FIGS. 7 to 11 differs from that of FIGS. 1 to 6 in that the entire inner surface of the corrugated tube 1 here is not lined with a layer of softer material, but instead the corrugated tube 1 upon emerging from the corrugator is provided with a lengthwise strip 11 of a softer thermoplastic material than the rest of the material of the corrugated tube 1, running in the lengthwise direction of the corrugated tube 1, but extending across the entire radial wall thickness of the corrugated tube 1.

Figure 7:
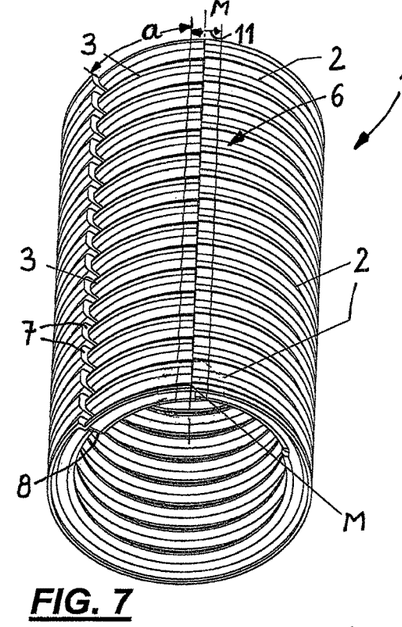
FIG. 7 a perspective representation of another embodiment of a corrugated tube according to the invention with a lengthwise strip of softer material, directly before making the longitudinal slit.

As shown by FIG. 7, this lengthwise strip 11 of softer material is arranged along the longitudinal lateral line M-M, such that it extends on either side of the longitudinal lateral line M-M.

Figure 8:
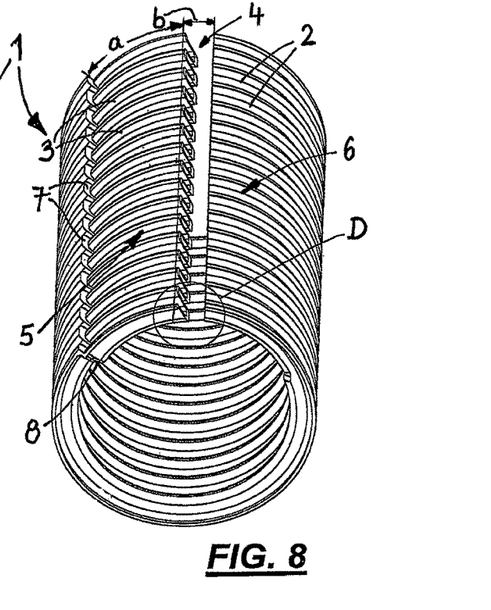
FIG. 8 a perspective representation of the corrugated tube of FIG. 7 directly after making the longitudinal slit.

Then, as shown in FIG. 8, when the lengthwise strip 4 is placed in the corrugated tube 1, the cut 3 will be situated such that the cut edge of the longitudinal slit 4 facing the edge region 6 coincides precisely with the end edge of the strip 11 situated there and thus, as shown by a comparison of FIGS. 7 and 8, the cut edge of the lengthwise strip 4 runs there inside the end segment of the edge region 6, so that after making the cut at the cut edge no more soft material remains at the cut edge at this end of the edge region 6.

Figure 10:
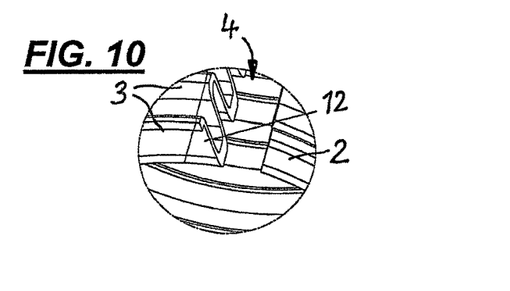
FIG. 10 detail D of FIG. 8, magnified.
Figure 11:
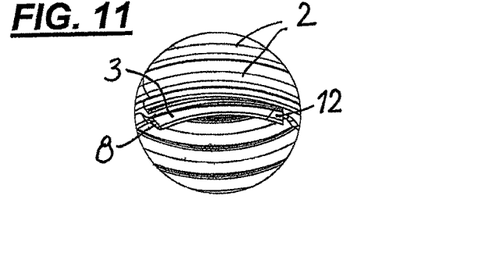
FIG. 11 detail F of FIG. 9, magnified.

The opposite cut surface of the longitudinal out 4 still extends within the region of softer material, as is especially well seen from the magnified representation of feature 1) in FIG. 10, so that at that end of the edge region 5 the entire cut plane of the longitudinal cut 4 lies within the soft region, so that, as shown by FIG. 10, a residual soft segment 12 remains at that end of the edge region 5 (with the corrugations 3 being somewhat radially deeper). Hence, the entire cut surface of the longitudinal slit 4 lies there in the soft material and accordingly is also formed entirely of this soft material.

It becomes evident from this that the width b of the longitudinal slit 4 is smaller than the width of the strip 11 of softer material, which ensures that even after performing the slitting process a small end segment 12 of softer material still remains at the end of the edge region 5 where the corrugations 3 are formed (see FIG. 10).

Figure 9:
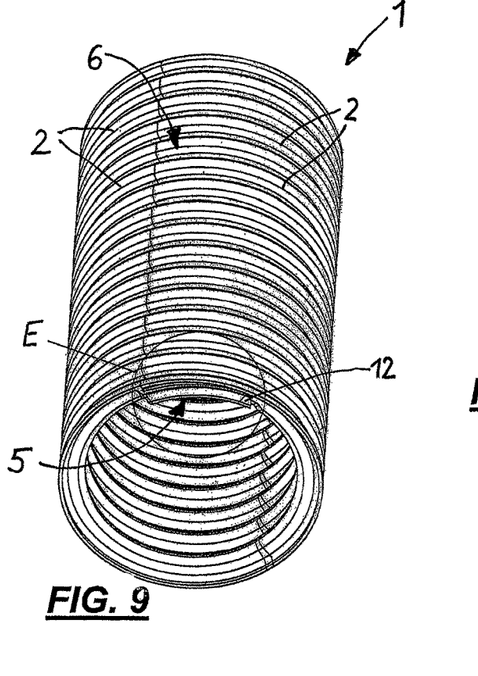
FIG. 9 a perspective representation of the corrugated tube from FIGS. 7 and 8 in its dosed position with maximum overlap of the edge regions, after performing the thermal deformation.

FIG. 9 now shows once more the closed position of the corrugated hose 1 with maximum overlap of the edge regions 5 and 6, i.e., the condition in which the edge region 6 shoved onto the edge region 5 comes to bear by its cut surface lying at its end against the radial shoulder 7 at the other end of the edge region 5 and thus against the end surface of the corrugations 2 there.

Figures 12, 13:
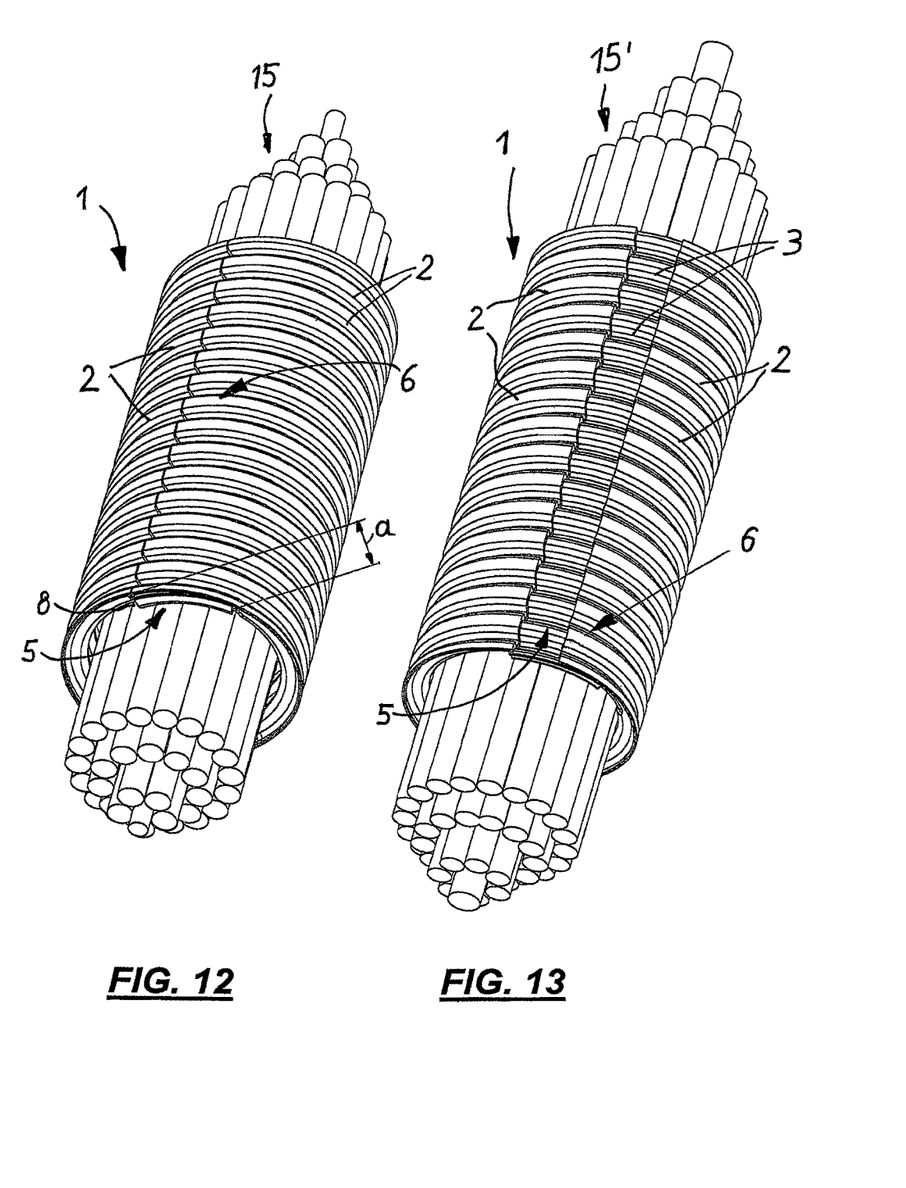
FIG. 12 a perspective representation of a corrugated tube according to the invention filled with electrical conductors in the closed position with maximum overlap of its edge regions on either side of the longitudinal slit.
FIG. 13 the corrugated tube according to the invention of FIG. 12, but here with a greater filling of electrical conductors in the closed position and with a smaller mutual overlap of the edge regions than in the case of FIG. 12.

The embodiment of the corrugated tube 1 as represented in FIGS. 12 and 13 shows a corrugated tube 1 which is provided with neither a soft internal layer 10 nor a lengthwise strip 11 of softer material, but instead has been made solely from one thermoplastic material.

As with the representation according to FIGS. 1 to 3, first of all a plastic tube is extruded from an extruder and then it is brought into a final form in a following corrugator, corresponding to the representation per FIG. 1 (but without a soft interior layer 10).

Next, according to FIG. 2, a longitudinal slit 4 is made along a longitudinal lateral line M-M (only present in concealed form in FIGS. 12 and 13) and a subsequent thermal deformation brings it into a closed position corresponding to FIG. 3 or also corresponding to the representation of FIG. 12, in which the edge regions 5, 6 completely overlap radially across the entire circumferential region a.

Now the use of such a corrugated tube 1 to contain a bundle of cables 15 is shown by the representation of FIG. 12. The space needed by the cable bundle inside the corrugated tube 1 is such that, in the closed state, a total overlap of the edge regions 5 and 6 occurs along the entire circumferential region a.

In order to insert the cables 15, the corrugated tube 1 is spread apart or opened up from its starting state, corresponding to FIG. 3 or 9 or 12, by means of a suitable device, far enough so that the longitudinal slit 4 is opened and then the cables 15 can be inserted through it into the inside of the corrugated tube 1.

Next, when the spreading action ceases for the corrugated tube 1, which due to the thermal deformation is elastically prestressed into its maximum closed position per FIG. 3 or 9 or 12, it folds back up into its closed position due to the elastic prestressing, as shown in FIG. 12.

If, now, the same corrugated tube 1 should accommodate a larger number of cables, a thicker cable bundle 15', as shown in FIG. 13, after inserting the cables into the corrugated tube 1 and when releasing the spreading action no spring back of the edge regions 5 and 6 to the maximum overlap as shown in FIG. 12 will occur, but instead only a shorter, partial overlap of the two edge regions 5, 6 will be present, as shown in FIG. 13. But even in this closed position the two edge regions 5, 6 will be held securely by the elastic prestressing, so that the corrugated tube 1 can also accommodate cable bundles corresponding to a larger nominal width than that occurring at maximum closed position (corresponding to FIG. 3 or 9 or 12) and it is not necessary to use a different corrugated tube with larger starting diameter for this.

For the formation of the corrugated tube 1, any suitable thermoplastic material can be used, wherein polypropylene (PP) or a polyamide (PA) with a Shore D hardness (per ISO 868) greater than 60 is recommended in particular as the harder material and a thermoplastic elastomer (TPE with a Shore A hardness less than 80 as the softer material.

Figure 14:
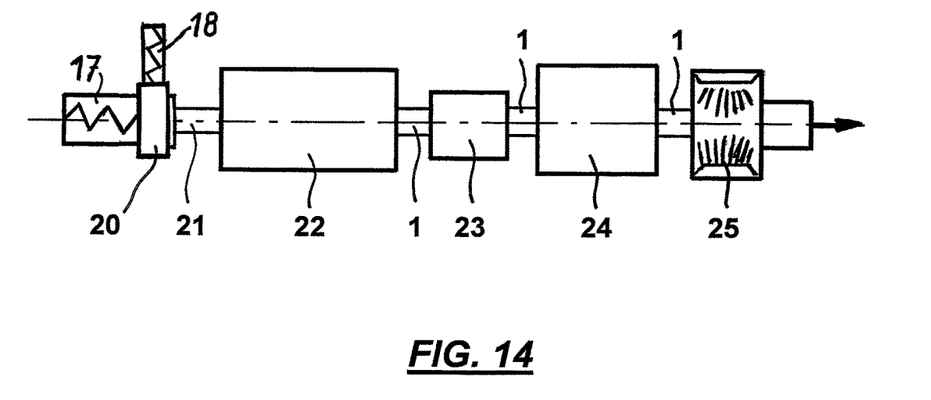
FIG. 14 a basic diagram of a layout for the manufacture of corrugated tubes according to the invention, and FIG. 15 a basic diagram of a longitudinal section through an injection head for a two-component coextrusion.

Finally, FIG. 14 shows the principle of a layout for the manufacturing of such a corrugated tube.

For the manufacturing, first of all a plastic tube 21 is extruded from an injection die (injection head) 20 and then taken to a following corrugator 22 of known kind, in which the plastic tube 21 is provided with corrugations encircling the circumference in the desired manner. The extrusion die 20 is connected to a first extruder 17 and a second extruder 18, wherein the first extruder 17 feeds a suitable thermoplastic material, such as a polypropylene or a polyamide with a Shore D hardness greater than 60, and the second extruder 18 a thermoplastic elastomer which is softer and has a Shore A hardness less than 80 to the injection head 20.

The corrugated plastic tube 1 then emerges from the corrugator 22 and is provided in a following slicing device 23 with a longitudinal slit along a lateral longitudinal line and then delivered to a device 24 for thermal deformation, preferably an IR deformation layout, in which the slit corrugated tube is heated to a temperature below the melting temperature of the thermoplastic material used and then converted stepwise while running through deforming rollers to a final shape, in which the edge regions 5, 6 on either side of the longitudinal slit 4 are brought into a radial overlap with each other in the circumferential direction until finally an overlap position is reached in which a complete overlap of the region of radially deeper lying corrugations at the one edge region by the radially higher lying corrugations at the other edge region occurs.

After this, the corrugated tube 1 is taken from the IR deformation layout 24 to a following cooling system 25 with a suitable cooling bath, and after moving through this the corrugated hose 1 is wound up or stored in pieces separated from each other.

When extruding the plastic tube 21 from the extruder 17 the option exists of performing a two-component extrusion, in which case two differently hard or soft thermoplastic materials are fed to the injection head 20 and coextruded in suitable manner.

For example, if a plastic tube is being extruded having a striplike length segment 11 made of a second, different thermoplastic material, then this can be done in coextrusion, by placing a torpedo insert centrally in the injection head of the extruder 17, acting as a displacement body and forming the emerging melt from the extruder 17 into a ring-shaped tube or hose 21. Through a side feed channel, a second thermoplastic material (such as a softer material) is fed radially from the side into the flow of melt around the torpedo, being coextruded with it, thereby forming a strip of this other material along the extruded plastic tube 21, after which in the following corrugator 22 the desired shaping with corrugations along the circumference can take place.

Figure 15:
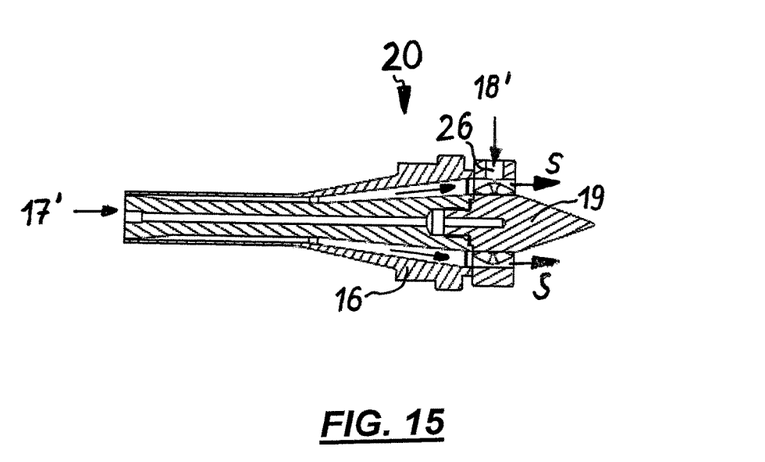

FIG. 15 shows in only a very basic manner a longitudinal section through an injection head 20 for a two-component coextrusion.

This comprises a nozzle body 16, in which a torpedo 19 is arranged, serving as a displacement body for the movement of the plastic melt 17' which is supplied by the first extruder 17 and representing the main flow of material, in order to form the plastic melt (arrow S) emerging from the injection head 20 into a ring-shaped tube 21.

The second extruder 18 extrudes a plastic melt 18' of a softer material through a feed channel 26 on the injection head 20 into the main material flow of the plastic melt 17' displaced radially outwards by the torpedo 19. In this way, the two plastic melts 17' and 18', chosen to be well compatible with each other, are combined and also react chemically so that a lengthwise strip of softer material is formed along the extruded tube 21, yet it is firmly joined to the harder material of the rest of the tube 21.

The invention claimed is:

1. A plastic corrugated tube for the encasing of conductors, with corrugations alternating in succession and distributed along its length, and having a longitudinal slit extending along a lateral longitudinal line, wherein the corrugated tube for the inserting of the conductors can be converted into an opened position, exposing the longitudinal slit, and also into a closed position, in which edge regions of the corrugated tube lying on either side of the longitudinal slit overlap, wherein the corrugated tube is elastically prestressed in the direction of assuming its closed position, and the edge region of the corrugated tube lying radially underneath the other edge region of the corrugated tube in the closed position is provided with corrugations on its circumference within a predetermined circumferential region, which are offset radially inwards as compared to the corrugations outside of the predetermined circumferential region and are configured such that in the closed position the corrugations within the predetermined circumferential region engage with the radial underside of the corrugations of the other edge region, wherein the corrugations engage so as to be displaceable relative to each other in the circumferential direction under the action of the elastic prestressing.

2. The corrugated tube as claimed in claim 1, wherein the engaging corrugations of the two edge regions are guided within each other during a displacement movement relative to each other with a form fitting in the displacement direction.

3. The corrugated tube as claimed in claim 1, wherein the radially bottom of the two edge regions in the closed position at its end segment directly next to the longitudinal slit consists of a material which is softer than the rest of the material of the corrugated tube.

4. The corrugated tube as claimed in claim 3, wherein the softer material of the end segment consists of a thermoplastic elastomer (TPE) and has a Shore A hardness of less than 80, while the rest of the material of the corrugated tube is a polypropylene (PP) with a Shore D hardness of more than 60.

5. The corrugated tube as claimed in claim 1, wherein an inner surface of the corrugated tube is provided with a layer of a material which is softer than the rest of the material of the corrugated tube.

6. The corrugated tube as claimed in claim 5, wherein the layer on the inner surface consists of a thermoplastic elastomer with a Shore A hardness of less than 80.

7. The corrugated tube as claimed in claim 1, wherein no radial joint is present on the outer circumference of the corrugated tube in the closed position with complete overlapping of the two edge regions over the entire predetermined circumferential region.

8. A method for manufacturing a corrugated tube as claimed in claim 1 with the following features:

a tube of a thermoplastic material is extruded continuously from an extruder through an injection head;

the extruded tube is deformed in a following corrugator into a corrugated tube with corrugations formed on the circumference, having on one side of a lateral longitudinal line corrugations along a predetermined circumferential region which are offset radially inwards with respect to the corrugations outside the predetermined circumferential region;

the corrugated tube is provided with a longitudinal slit running along the lateral longitudinal line in a slitting device connected after the corrugator;

after this, the lengthwise-slit corrugated tube is taken through an IR deformation layout in which it is moved in stepwise fashion into a predetermined closed position under heating to a temperature below the melting temperature of the thermoplastic material and with overlapping edge regions of the corrugated tube lying on either side of the longitudinal slit such that the corrugations of the edge regions engage so as to be displaceable relative to each other in the circumferential direction under the action of an elastic prestressing;

directly after converting the corrugated tube to the predetermined closed position, the corrugated tube is transferred to and cooled at a following cooling system;

after this, the corrugated tube is wound up as meterware or sliced into a plurality of pieces of predetermined length.

9. The method of claim 8, wherein the corrugations within the predetermined circumferential region form a radially inwardly directed shoulder at the outside of the corrugated tube and project radially opposite to the shoulder by a distance into the inside of the corrugated tube.

10. The method as claimed in claim 8 for manufacturing a corrugated tube wherein the radially bottom of the two edge regions in the closed position at its end segment directly next to the longitudinal slit consists of a material which is softer than the rest of the material of the corrugated tube, wherein the injection head is further fed with a second thermoplastic material from a second extruder, which is softer than another thermoplastic material fed from the extruder, wherein the plastic tube extruded from the injection head consists of a lengthwise strip of the softer thermoplastic material extending over a predetermined circumferential width along the lateral longitudinal line, while the rest of the corrugated tube is formed from the other thermoplastic material, and wherein the longitudinal slit is made in the slitting device in such a way that a lengthwise side of the longitudinal slit facing the corrugations of the radially outward edge region of the corrugated tube in the closed position coincides with a lengthwise side of the softer lengthwise strip of the corrugated tube, and the longitudinal slit is sliced, looking in the circumferential direction of the corrugated tube, with a width which is less than the circumferential width of the lengthwise strip.

11. The method as claimed in claim 10, wherein the longitudinal slit formed on the corrugated tube in the slitting device has a width of 3 mm to 5 mm when open.

12. The method as claimed in claim 10, wherein the softer material of the end segment consists of a thermoplastic elastomer (TPE) and has a Shore A hardness of less than 80, while the rest of the material of the corrugated tube is a polypropylene (PP) with a Shore D hardness of more than 60.

13. The corrugated tube as claimed in claim 1, wherein the corrugations within the predetermined circumferential region form a radially inwardly directed shoulder at the outside of the corrugated tube and project radially opposite to the shoulder by a distance into the inside of the corrugated tube.

\* \* \* \* \*